United States Patent [19]

Francis

[11] Patent Number: 4,599,910
[45] Date of Patent: * Jul. 15, 1986

[54] SPEED REDUCING AND TORQUE TRANSMITTING MECHANISM

[75] Inventor: John H. Francis, Charles Town, W. Va.

[73] Assignee: Frederick Manufacturing Company, Frederick, Md.

[*] Notice: The portion of the term of this patent subsequent to May 7, 2002 has been disclaimed.

[21] Appl. No.: 426,875

[22] Filed: Sep. 29, 1982

[51] Int. Cl.$^4$ ............... F16H 13/02; F16H 13/10; F16H 15/16
[52] U.S. Cl. .................... 74/206; 74/212; 74/191
[58] Field of Search ............. 74/800, 798, 191, 202, 74/206, 208, 212, 190, 190.5, 193

[56] References Cited

U.S. PATENT DOCUMENTS

| | | | |
|---|---|---|---|
| 20,461 | 6/1858 | Wilson et al. | 74/798 |
| 792,477 | 6/1905 | Swelund | 74/755 |
| 1,382,244 | 6/1921 | Roudil et al. | 74/191 |
| 2,079,681 | 5/1937 | Chilton | 74/191 |
| 2,336,799 | 12/1943 | Palm | 74/193 |
| 2,721,483 | 10/1955 | Hacker | 74/191 |
| 3,158,041 | 11/1964 | Rae | 74/191 |
| 3,216,285 | 11/1965 | Nasuytis | 74/798 |
| 3,388,607 | 6/1968 | Stober et al. | 74/191 |
| 3,910,137 | 10/1975 | Nedeljkovitch | 74/191 |
| 3,955,432 | 5/1976 | Kemper | |
| 4,293,050 | 10/1981 | Goloff et al. | |
| 4,459,840 | 7/1984 | Francis | 72/452 |
| 4,466,303 | 8/1984 | Stober | 74/191 |
| 4,515,028 | 5/1985 | Van Der Linden et al. | 74/191 |

FOREIGN PATENT DOCUMENTS

| | | |
|---|---|---|
| 220789 | 1/1909 | Austria . |
| 0107388 | 5/1984 | European Pat. Off. . |
| 435736 | 3/1912 | France . |
| 473349 | 1/1915 | France ................... 74/800 |
| 1003009 | 3/1952 | France ................... 74/191 |
| 1227486 | 8/1960 | France . |
| 2254736 | 11/1975 | France . |
| 2418136 | 9/1979 | France . |
| 0094161 | 6/1982 | Japan .................... 74/798 |
| 58295 | 4/1946 | Netherlands ........... 74/191 |
| 2076081 | 11/1981 | United Kingdom . |

OTHER PUBLICATIONS

"Traction Drives" Frederick W. Heilich III and Eugene E. Shube, 1983, Marcel Dekker Inc.
"10 Universal Shaft Couplings" Frederico Strasser *Mechanisms, Linkages, and Mechanical Controls*, pp. 326-327, 1965.

Primary Examiner—Kenneth J. Dorner
Assistant Examiner—Mike Bednarek
Attorney, Agent, or Firm—Millen & White

[57] ABSTRACT

A speed reducing and torque transmitting mechanism includes a planar surface which is perpendicular to a first axis and a cone which rolls on the planar surface as the cone revolves around the first axis. The axis around which the cone rotates as it rolls intersects the first axis at the same point that the first axis intersects the planar surface so that under ordinary circumstances there is no slippage between the cone and the planar surface. The cone is driven by an input shaft which is coaxial with the first axis. An output shaft is connected to the cone via a crank having an arm oriented obliquely thereto in which arm the cone is rotatably journaled. An output shaft is connected to the cone adjacent to the apex thereof by a universal joint. The output shaft rotates in a direction opposite to the input shaft at substantially reduced rate with increased output torque. The mechanism is inherently torque limiting and delivers constant output torque if supplied with constant input torque.

9 Claims, 3 Drawing Figures

SPEED REDUCING AND TORQUE TRANSMITTING MECHANISM

BACKGROUND OF THE INVENTION

The instant invention relates to a speed reducing and torque transmitting mechanism, more particularly, the instant invention relates to a highly efficient speed reducing and torque transmitting mechanism wherein friction is minimized, output torque is constant and output torque can be conveniently limited.

TECHNICAL CONSIDERATIONS AND PRIOR ART

Most speed reducing mechanisms utilize a train of gears, an arrangement of belts and pulleys or perhaps chains and sprockets. These mechanisms have many well-recognized drawbacks. For example, gear transmissions require lubrication since they necessarily require some sliding motion. In addition, gear box speed reducers are noisy. Moreover, precision gears are relatively expensive to manufacture and engineer due to their complex shape and due to the machining necessary to produce such gearing. If a gear box is utilized in a situation where it is desirable to limit torque, then a torque limiting coupling or clutch must be used in addition to the gear box. While it is possible to obtain a constant average torque output from a gear box, there are always undulations in the output torque due to sliding action between meshing gear teeth.

While belts and pulleys do not require lubrication, there is a tendency for the belts to stretch, slip and degrade due to friction between the belts and pulleys. If the belts ride in grooves in the periphery of the pulleys, there is necessarily sliding contact between belts and grooves. Generally, belt transmissions have limited longevity and reliability.

Chain and sprocket transmissions are perhaps a bit more predictable than belt transmissions, however, chain and sprocket transmissions require lubrication and are relatively noisy. Since they are not inherently torque limiting, other mechanisms must be utilized if a torque limiting feature is desired. Moreover, chain and sprocket mechanisms are relatively expensive to manufacture.

In view of the difficulties with these conventional mechanisms, other approaches have been tried wherein cones are utilized. For example, in U.S. Pat. No. 4,161,890, a cone rotates about a stationary surface but since the stationary surface is generally parallel to the axis of the cone instead of horizontal with respect thereto, no appreciable torque escallation is accomplished. Moreover, the drive is essentially a friction drive.

In view of the aforementioned considerations, there is a need for a new and improved speed and torque transmitting mechanism.

SUMMARY OF THE INVENTION

It is a feature of the instant invention to provide a new and improved speed reduction and torque transmission mechanism wherein the mechanism is highly efficient, the output torque is constant and the mechanism requires no lubrication. Moreover, is the feature of the instant invention to provide a new and improved speed reducing and torque transmitting mechanism which limits the amount of torque transmitted.

In view of these features and other features, the instant invention contemplates a new and improved speed reduction mechanism which includes a first shaft which rotates about a first axis normal to a planar surface on which planar surface a cone rotates in line contact therewith. The cone is mounted on a crank which has its input aligned with the first shaft and which journals the cone to rotate about an axis which intersects the planar surface at the same point that the axis of the first shaft intersects the planar surface. A constant velocity joint is connected to the cone at a point aligned with the apex of the cone and an output shaft is connected to the universal joint. The output shaft rotates at a speed less than the input shaft upon rotating the input shaft but with a higher torque than that applied to the input shaft.

The instant invention further contemplates adjusting the force with which the conical surface is urged against the planar surface so that torque in excess of a predetermined torque will not be passed through the mechanism from the first shaft to the second shaft due to slippage between the conical surface and the planar surface upon the application of torque.

DESCRIPTION OF A PREFERRED EMBODIMENT

Figure 1:
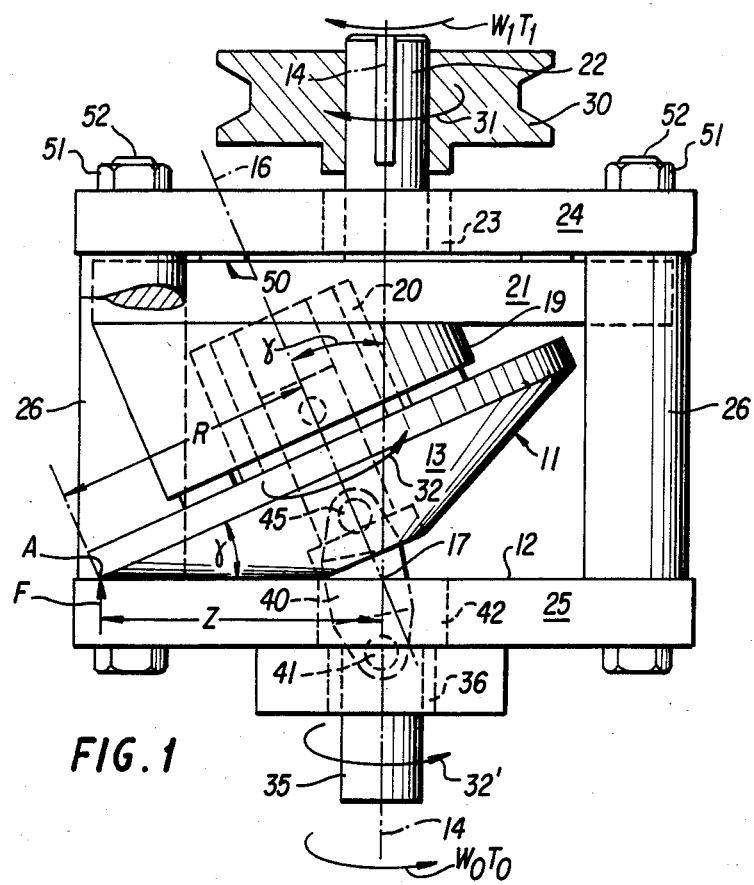
FIG. 1 is a side view of the speed reducing and torque transmitting mechanism in accordance with the features of the instant invention.
Figure 2:
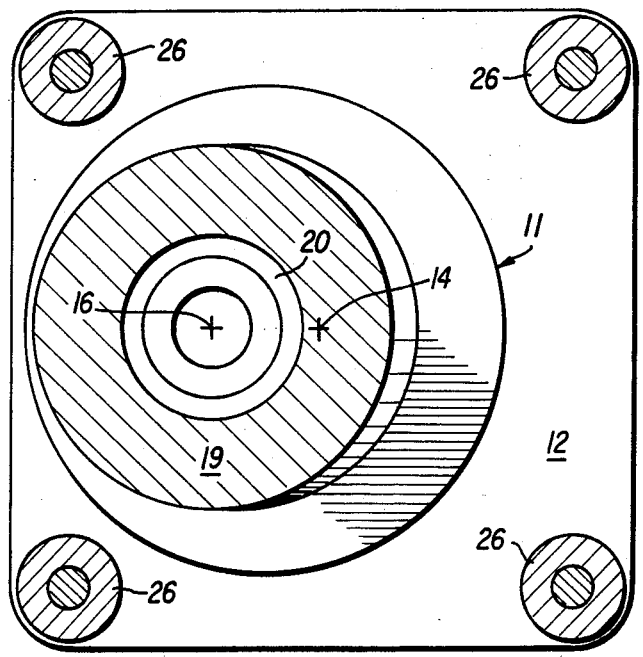
FIG. 2 is a top view taken along line 2—2 of FIG. 1.

Referring now specifically to the figures, there is shown a speed reducing mechanism, designated generally by the numeral 10, which is also a torque transmitting mechanism. In accordance with the principles of the instant invention, a cone, designated generally by the numeral 11, has a conical surface 13 which rolls on a planar surface 12. A first axis 14 extends perpendicular to the planar surface 12 and defines an axis about which the cone 11 revolves as the conical surface 13 rolls on the planar surface. As the cone 11 rolls, it rotates about its axis 16 which intersects the first axis 14 at a point 17 which point is the point that both axes intersect the plane of the planar surface 12.

The cone 11 is mounted in a wobble arm 19 via roller bearings 20 so as to rotate about the axis 16. The wobble arm 19 is rigidly fixed to a disk 21 at an oblique angle $\gamma$. A drive shaft 22 is rigidly connected to the disk 21 to form a crank. The drive shaft 22 is journaled by bearings 23 to rotate in a first plate 24 about the first axis 14. The plate 24 extends perpendicular to the axis 14 and is connected to a second plate 25 (on which the planar surface 12 is defined) by rigid spacers 26 which spacers maintain a parallel relationship between the plates 24 and 25.

The drive shaft 22 has a driving pulley or perhaps a gear, 30, keyed thereto which transmits torque to the shaft 22. As the shaft 22 rotates in one direction, i.e., the direction of arrow 31, the cone 11 rotates in the opposite direction, i.e., the direction of arrow 32, about the axis 16. Accordingly, the cone 11 revolves around the axis 14 as it rolls with progressive line contact over the planar surface 12 due to rotation about the axis 16. Since the conical surface 13 rolls on the planar surface 12, there is only line contact therebetween and the friction between the surfaces is purely rolling friction. Accordingly, none of the components slide relative to one another which negates the need for lubrication.

In a more general sense, the planar surface or first bearing surface 12 has a generatrix a radially extending straight line, coincident with contact line 34, which intersects the first axis 12 at the point 17 and rotates through 360° about the point at a constant angle $\theta$ with respect to the first axis.

An output shaft 35 is aligned with the input shaft 22 and the first axis 14. The output shaft 35 is journaled in bearings 36 so as to be held perpendicular to the plate 24 and aligned with the first axis 14. A constant velocity joint 40 is connected to the output shaft 35 by a first pin 41 and passes through an opening 42 in the plate 24. The constant velocity joint 40 is connected to the cone 11 by a second pin 45. The constant velocity joint 40 revolves about the point 17 as the cone 11 rolls on surface 12 to transmit torque directly through to the output shaft 35. Preferably, a double Cardin universal joint is utilized. In order to accommodate the wobbling movement of the universal joint 40, the cone 11 is truncated and a cylindrical cavity 47 is provided therein through which the constant velocity joint passes.

The cone 11 rotates about axis 16 at a rate which is substantially slower than the rate of rotation of the drive shaft 22. The speed reduction ratio is determined by the following relationship wherein R is the radius of the cone 11 with respect to the axis 16 about which the cone 11 rotates; z is the radius of the conical surface 13 taken perpendicularly with respect to the first axis 14 and $\gamma$ is the angle of inclination of the cone.

The Speed Reduction Ratio $= R/(z-R)$;

However, since $R = z \cos \gamma$, the Speed Reduction Ratio is also equal to $\cos \gamma/(1 - \cos \gamma)$. Consequently, as $\gamma$ decreases, the speed reduction ratio increases.

The speed reducer mechanism is essentially a constant output torque device since the output torque $T_0$ is a function of the applied force "F" at point "A" such that: $T_0 = \mu_f F Z$ where $\mu_f$ is the static friction coefficient between the surface 13 of the cone 11 and the surface 12 of the plate 24 and Z is the distance between axis 14 and point "A".

The mechanism is also a torque limiting device since torque in excess of the input torque $T_0$ will cause the cone 11 to slip on the surface 12. In this regard, bearings 50 may be disposed between the disk 21 and the plate 24. By tightening nuts 51 on shafts 52, the plate 24 which has a second bearing surface 45 thereon compresses with greater force against the disk 21 through the bearings 50 and increases the force "F" with which the surface 13 of cone 11 engages surface 12 of plate 24. By increasing the force "F", the amount of torque deliverable through to the shaft 35 can be increased. Accordingly, the torque limiting capability is adjustable.

Figure 3:
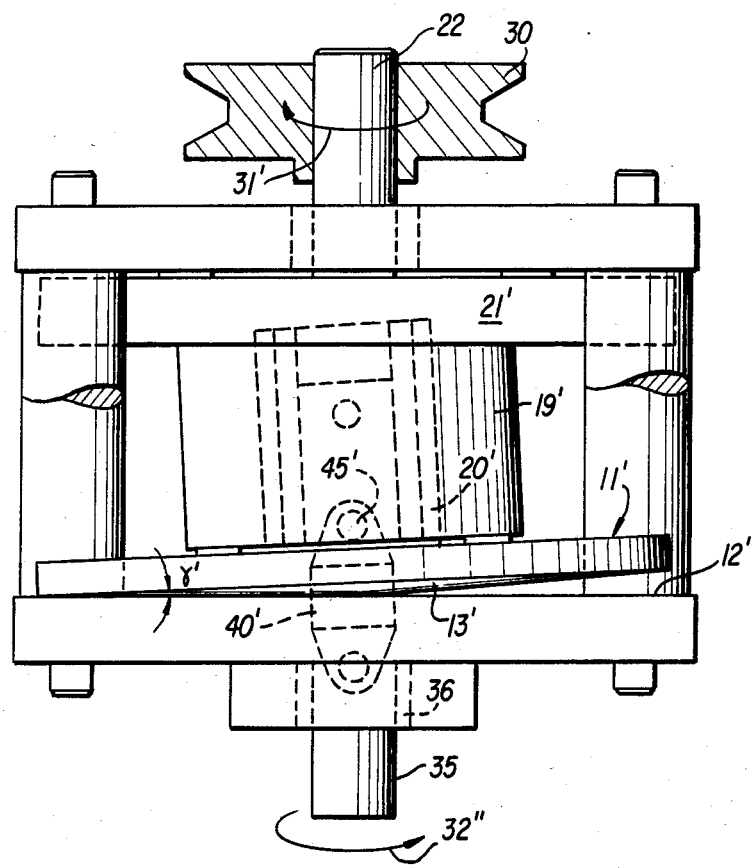
FIG. 3 is a side view similar to FIG. 1 showing a speed reducing and torque transmitting mechanism with a small conical angle resulting in very high speed reduction and torque gain.

Referring now specifically to FIG. 3, where similar components have similar numerals and where modified components have similar primed numerals, another embodiment of the invention is shown where the cone angle $\gamma'$ of cone 11 is very small. By having a very small angle $\gamma$, the speed reduction ratio can be increased drastically—upwards to a million to one wherein a very high input speed results in a very low output speed. Accordingly, the amount of torque available on the output shaft 35 can be increased to enormous levels.

The foregoing embodiments are merely indicative of the invention which is to be limited only by the following claims.

What is claimed is:

1. A speed reduction mechanism for transmitting torque less than a predetermined torque comprising:
   a first shaft;
   means for mounting the first shaft for rotation about a first axis;
   a first bearing surface having as a generatrix at least a portion of a radially extending straight line intersecting the first axis at a point and rotating about the point through 360° at a constant angle with respect to the first axis;
   a cone having a surface in direct, unlubricated engagement with the first bearing surface along a line of contact which is coincident with the radially extending straight line which forms a genetraix of the first bearing surface, the cone having an apex which is substantially coincident with the point on the first axis about which the generatrix rotates;
   cone mounting means for mounting the cone to rotate about a second axis oblique with respect to the first axis and coincident with the axis of the cone, the second axis intersecting the point on the first axis about which the generatrix rotates;
   means for connecting the cone mounting means to the first shaft to rotate the cone mounting means about the first axis in a first direction, wherein the conical surface revolves in the opposite direction around the point of intersection to the first direction as the conical surface rotates about the second axis so that the conical surface rolls over the first bearing surface in progressive line contact therewith without slipping with respect thereto until a torque is applied thereto which is greater than the predetermined torque;
   a constant velocity joint connected to the cone at the apex thereof and aligned with the first axis;
   a second shaft connected to the constant velocity joint and extending in alignment with the first axis, whereby the second shaft rotates at a speed less than the first shaft upon rotating the first shaft but with higher torque than that applied to the first shaft, and
   means for adjusting the force with which the conical surface is urged against the first bearing surface to adjust the predetermined torque, wherein torque in excess of the predetermined torque will not be passed through the mechanism from the first shaft to the second shaft due to slippage between the conical surface and the first bearing surface.

2. The mechanism of claim 1 wherein the first shaft is the input shaft and the second shaft is the output shaft.

3. The speed reduction mechanism of claim 1 wherein the means for connecting the cone mounting means to the input shaft is a plate and wherein the speed reduction mechanism further includes:
   a second bearing surface facing the first bearing surface with the plate disposed therebetween;
   rolling bearing means between the second surface and the plate for allowing the plate to rotate with respect to the second bearing surface, and
   means for urging the second surface toward the plate to determine the pressure with which the conical surface engages the first bearing surface to thereby determine the coefficient of friction between the conical and first bearing surfaces and to limit the predetermined torque transmitted by the mechanism from the first shaft to the second shaft.

4. The mechanism of claim 3 further including means extending between the planar surface and second surface for adjusting the pressure applied by the urging means.

5. The mechanism of claim 1 wherein the first bearing surface is a plane.

6. The speed reduction mechanism of claim 5 wherein the means for connecting the cone mounting means to the input shaft is a plate and wherein the speed reduction mechanism further includes:
 a second bearing surface facing the first bearing surface with the plate disposed therebetween;
 rolling bearing means between the second surface and the plate for allowing the plate to rotate with respect to the second bearing surface, and
 means for urging the second surface toward the plate to determine the pressure with which the conical surface engages the first bearing surface to thereby determine the coefficient of friction between the conical and first bearing surfaces and to limit the predetermined torque transmitted by the mechanism from the first shaft to the second shaft.

7. The mechanism of claim 5 wherein the first shaft is the input shaft and the second shaft is the output shaft.

8. A mechanism for transmitting torque less than a predetermined torque comprising:
 a first bearing surface having as a generatrix a radially extending straight line intersecting the first axis at a point and rotating about the point through 360° at a constant angle with respect to the first axis;
 a cone having a surface in direct, unlubricated engagement with the first bearing surface along a line of contact which is coincident with the radially extending straight line which forms a genetraix of the first bearing surface, the cone having an apex which is substantially coincident with the point on the first axis about which the generatrix rotates;
 cone mounting means for mounting the cone to rotate about a second axis, oblique with respect to the first axis, the second axis intersecting the point on the first axis about which the generatrix rotates;
 means for connecting the cone mounting means to the first shaft to rotate the cone mounting means about the first axis in a first direction, wherein the conical surface revolves around the point of intersection to the first direction as the conical surface rotates about the second axis to roll over the first bearing surface in progressive line contact therewith without slipping with respect thereto until a torque is applied thereto which is greater than the predetermined torque;
 coupling means for connecting the cone to the second shaft, whereby the second shaft rotates at a speed different from the first shaft, and
 means for adjusting the force with which the cone is urged into engagement with the bearing surface whereby the torque at which the conical surface slips with respect to the bearing surface is selectable.

9. The mechanism of claim 8 wherein the first bearing surface is a plane.

* * * * *